US009465237B2

(12) United States Patent
Tate et al.

(10) Patent No.: US 9,465,237 B2
(45) Date of Patent: Oct. 11, 2016

(54) AUTOMATIC FOCUS PRESCRIPTION LENS EYEGLASSES

(71) Applicant: Intel Corporation, Santa Clara, CA (US)

(72) Inventors: Larry R. Tate, Hopkinton, MA (US); Simon N. Peffers, Acton, MA (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 14/142,591

(22) Filed: Dec. 27, 2013

(65) Prior Publication Data

US 2015/0185503 A1 Jul. 2, 2015

(51) Int. Cl.
| | |
|---|---|
| *G02C 7/00* | (2006.01) |
| *G02C 7/02* | (2006.01) |
| *G02C 7/04* | (2006.01) |
| *G02C 11/00* | (2006.01) |
| *G06F 3/01* | (2006.01) |
| *G02C 7/08* | (2006.01) |

(52) U.S. Cl.
CPC .............. *G02C 11/10* (2013.01); *G02C 7/083* (2013.01); *G06F 3/013* (2013.01)

(58) Field of Classification Search
CPC ............ G02B 27/017; G02B 27/0172; G02B 27/0176; G02B 2027/0178; G02B 2027/0187; G02B 2027/0132; G02B 2027/014; G02B 23/125; G02C 7/081; G02C 7/083; G02C 7/085; G02C 7/08; A61B 3/113; A61B 5/00; G03B 13/36; G06F 3/013
USPC ............ 351/159.03, 159.39, 246, 41; 345/8; 396/51
See application file for complete search history.

(56) References Cited

U.S. PATENT DOCUMENTS

| | | | |
|---|---|---|---|
| 3,598,479 A | 8/1971 | Wright et al. | |
| 4,190,330 A | 2/1980 | Berreman | |
| 5,777,715 A * | 7/1998 | Kruegle | G02B 23/125 345/8 |
| 6,478,452 B1 | 11/2002 | Richardson et al. | |
| 8,130,260 B2 | 3/2012 | Krill et al. | |
| 9,077,973 B2 | 7/2015 | Aguren | |
| 2008/0117289 A1 | 5/2008 | Schowengerdt et al. | |
| 2008/0129839 A1* | 6/2008 | Asukai | H04N 5/2251 348/231.99 |
| 2010/0013739 A1* | 1/2010 | Sako | A61B 5/742 345/8 |
| 2012/0133891 A1 | 5/2012 | Jiang | |

(Continued)

OTHER PUBLICATIONS

Non-Final Office Action mailed Jul. 24, 2015, in U.S. Appl. No. 14/142,579, 14 pages.

(Continued)

*Primary Examiner* — Bumsuk Won
*Assistant Examiner* — Collin X Beatty
(74) *Attorney, Agent, or Firm* — Blakely, Sokoloff, Taylor & Zafman LLP

(57) ABSTRACT

Embodiments are generally directed to automatic focus prescription lens eyeglasses. An embodiment of an apparatus includes one or more variable focus lenses coupled; one or more actuators to change the focus of the variable focus lenses; and one or more focus distance components coupled to detect a focus distance of one or more eyes of a user of the apparatus. The one or more actuators set a focal distance of each of the one or more variable focus lenses, a focal distance setting for each of the one or more variable focus lenses being determined in response to the focus distance of the one or both eyes of the user; and the focal distance setting for each of the one or more variable focus lenses includes adjustment for a vision prescription of the user.

23 Claims, 10 Drawing Sheets

(56) References Cited

U.S. PATENT DOCUMENTS

| | | | |
|---|---|---|---|
| 2012/0194781 A1* | 8/2012 | Agurok | G02C 7/081 |
| | | | 351/201 |
| 2012/0200676 A1 | 8/2012 | Huitema et al. | |
| 2013/0050070 A1 | 2/2013 | Lewis et al. | |
| 2013/0050432 A1 | 2/2013 | Perez et al. | |
| 2013/0114043 A1 | 5/2013 | Balan et al. | |
| 2014/0002587 A1 | 1/2014 | Aguren | |
| 2015/0003819 A1* | 1/2015 | Ackerman | G02B 7/287 |
| | | | 396/51 |
| 2015/0234476 A1 | 8/2015 | Schowengerdt et al. | |

OTHER PUBLICATIONS

"Adjustable-focus eyeglasses," Wikipedia, retrieved from the Internet on Nov. 29, 2013, at en.wikipedia.org/wiki/Adjustable-focus_eyeglasses#cite_note-2, 5 pages.

"Today 3D, Basic rules to avoid 3D eyestrain," dated Aug. 3, 2010, retrieved on Nov. 12, 2013, at www.today3d.com/2010/08/basic-rules-to-avoid-3d-eyestrain.html, 2 pages.

Coxworth, Ben, "TruFocals eyeglasses feature adjustable focus," Oct. 12, 2010, retrieved from the Internet on Nov. 29, 2013, at www.gizmag.com/trufocals-adjustable-focus-eyeglasses/16629/, 11 pages.

Hanlon, Mike, "Eyeglasses with adaptive focus," retrieved from the Internet on Nov. 29, 2013, at www.gizmag.com/go/5516/, 8 pages.

Markoff, John, "Making Eyeglasses That Let Wearers Change Focus on the Fly," The New York Times, published Aug. 3, 2009, retrieved from the Internet on Nov. 29, 2013, at www.nytimes.com/2009/08/04/science/04prof.html?_r=0, 7 pages.

Final Office Action mailed Nov. 5, 2015, in U.S. Appl. No. 14/142,579, 16 pages.

Non-Final Office Action for U.S. Appl. No. 14/142,579 mailed on Mar. 17, 2016, 15 pages.

* cited by examiner

AUTOMATIC FOCUS PRESCRIPTION LENS EYEGLASSES

TECHNICAL FIELD

Embodiments described herein generally relate to the field of electronic devices and, more particularly, to automatic focus prescription lens eyeglasses.

BACKGROUND

Systems are utilizing new interfaces with users as the miniaturization of system elements and the increase in processing power and communication speeds allow further operations. Such devices may include items such as eyeglasses or goggles for used in watching displays, or the combination of a display and eyeglasses in a wearable display.

However, a limitation in use of eyeglasses or goggles by users is the limitation in vision of users. A majority of people worldwide use some form of vision correction, such as eyeglasses with prescription lenses or contact lenses. In particular, a great number of persons require different vision correction for different distances and for astigmatism and other correctable vision impairments, which are commonly corrected with multi-focus lenses (commonly bifocal or trifocal) lenses or similar vision correction.

In a conventional device, vision of a user may be corrected with a manual focusing element of eyeglasses or goggles or the use of bifocal or trifocal lenses that require the user to look at different portions of a lens to achieve correction for different distances. This provides for limited vision for a user, and an awkward user interface for electronic devices and systems.

BRIEF DESCRIPTION OF THE DRAWINGS

Embodiments described here are illustrated by way of example, and not by way of limitation, in the figures of the accompanying drawings in which like reference numerals refer to similar elements.

DETAILED DESCRIPTION

Figure 1A:
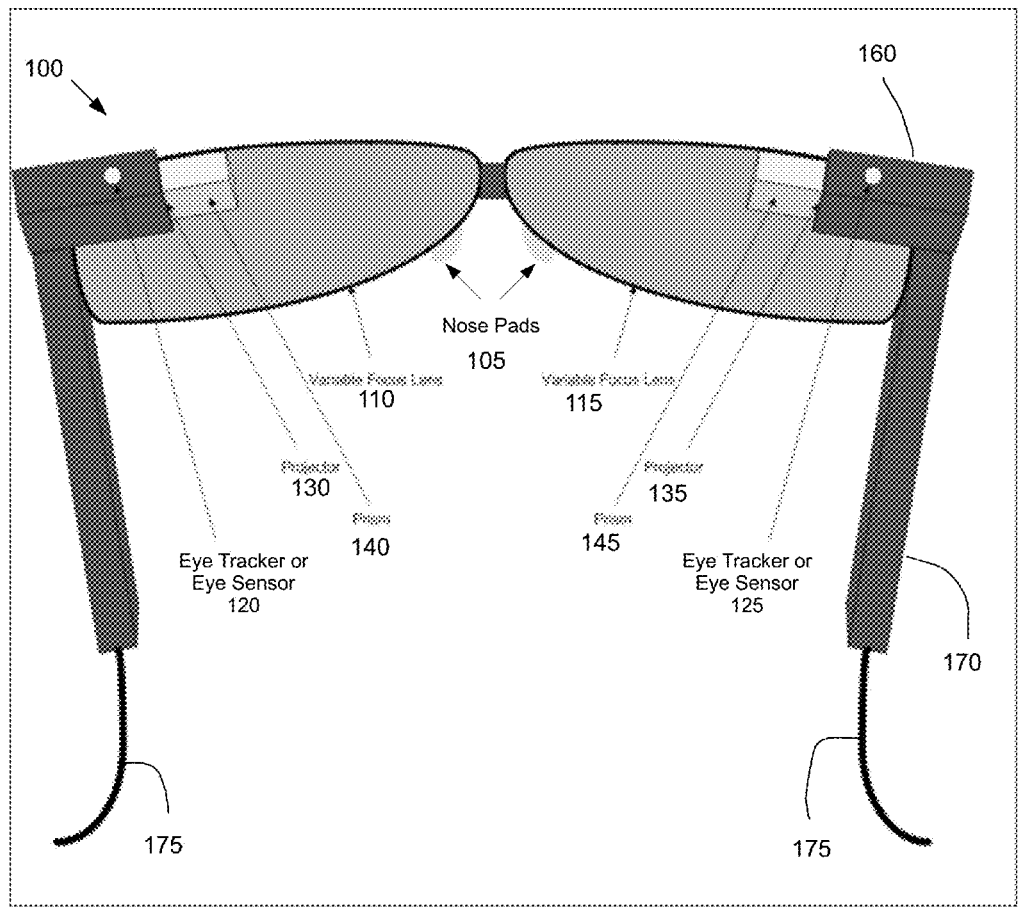
FIG. 1A is an illustration of an embodiment of autofocus eyeglasses including an implementation of a heads up display function which can function as a computer display.

Embodiments described herein are generally directed to automatic focus prescription lens eyeglasses.

For the purposes of this description:

"Glasses" or "eyeglasses" means a set of one or more vision correction elements for a person. The terms "glasses" or "eyeglasses" are intended to include eyeglasses, goggles, contact lenses, and other similar external elements for correcting vision of one or both eyes of a person.

"Focus distance" means a distance at which the eyes of a user of eyeglasses are focused. Focus distance may also be referred to as a gaze distance. A focus distance may be a particular distance measurement or may be a relative distance, such as near distance, middle distance, and far distance.

"Mobile device" means a smartphone, smartwatch, tablet computer, handheld computer, mobile Internet device, wearable technology, or other mobile apparatus that includes processing ability and communication ability.

In some embodiments, automatic focus prescription lens eyeglasses (also referred to as autofocus eyeglasses) provide automatic near to far prescription corrective eyeglasses. In some embodiments, the autofocus eyeglasses may further function as a computer display, and may provide macro and telephoto functions. In some embodiments, eyeglasses include variable focus lenses, where the focal length of the lenses is changed dynamically in response to a detected focus distance of a user of the autofocus eyeglasses.

In some embodiments, one or more cameras embedded in the frame of the autofocus eyeglasses, mounted on the frame of the eyeglasses, or otherwise coupled with the eyeglasses continuously observe a focus distance of the user of the eyeglasses, such as whether the user is focusing on an object far away, near, or in between. In some embodiments, a controller, where the controller may be a microcontroller, microprocessor, ASIC logic, or other controller, continuously selects between multiple focal length settings. In some embodiments, the controller is a part of the autofocus eyeglasses, and in other embodiments the controller is a part of an external apparatus or system, where the external apparatus may be connected with the autofocus eyeglasses by a wireless or wired connection, where a wired connection includes optical (such as fiber optic) cables as well as metallic cables. In some embodiments, the focal length settings are two or more in number, such as two settings (such as near focus and far focus settings) or three settings (such as near focus, medium distance focus, and far focus settings). However, embodiments are not limited to a particular number of focal length settings. In some embodiments, the lenses of autofocus eyeglasses include correction for the vision of the user, such as the prescription of the user for one or more distances.

In some embodiments, a first mechanism is included in autofocus eyeglasses for determining a focus distance of a user, and a second mechanism is included in autofocus eyeglasses to provide for controlling variable focus lenses in order to modify the focal length of the variable focus lenses in response to the detected focus distance of the user. In some embodiments, the second mechanism provides a correction for the vision prescription of the user, where the correction may vary at different distances. In some embodiments, the types of vision prescriptions that can be corrected by the autofocus mechanism include but are not limited to myopia, hyperopia, presbyopia, and astigmatism.

The determination of a focus distance of a user may be performed in multiple different ways. In some embodiments, autofocus eyeglasses include one or more eye trackers to enable operation utilizing eye position tracking. In some embodiments, autofocus eyeglasses include measurement of lens width or thickness of a user's eyes, where the width or thickness of the lens is indicative of the distance of focus of the user's eyes. Accommodation is the process by which an eye changes optical power to maintain focus on an object as its distance varies, where accommodation for the human eye occurs by changing the shape of the lens of the eye. The change in the shape of the lens is controlled by the ciliary muscles inside the eye, such muscles causing the lens to become more spherical for focusing on a near point and flatter for focusing on a distant point.

In some embodiments, autofocus eyeglasses further include one or more components to enable projection of an image to a user of the eyeglasses, such as a projection of a computer system display, a game system display, or other visual display. In some embodiments, the eyeglasses include one or more projectors and one or more prisms, such as a projector and a prism for each of two lenses of the eyeglasses, wherein the eyeglasses utilize the projector and prism to project the computer or other visual display functions, wherein the images are prescription corrected for the vision of the user using signal processing, which may be accomplished using software on a processor or with special hardware, to pre-process the images. In some embodiments, eyeglasses may alternatively include one or more transparent display lenses for the presentation of images to a viewer, where a transparent lens and a variable focus lens may together form a lens unit. Correct for the prescription is accomplished using signal processing, which may be accomplished using software on a processor or with special hardware, in this case before feeding the image to the display.

In some embodiments, autofocus eyeglasses further vary the variable focus lenses employed in the eyeglasses to support one or more of a telephoto function or a macro function. In some embodiments, the user is able to switch the eyeglasses to one or more of the macro function or the telephoto function by touching a switch on the eyeglasses, by sending a command through a mobile device, by voice command, or otherwise providing a command to the autofocus eyeglasses. In some embodiments, autofocus eyeglasses may be operable to automatically switch to the telephoto or macro functions, such as by detecting that a viewer is attempting to focus on a distant object, resulting in activation of the telephoto function, or is attempting to focus on a very near object, resulting in activation of the macro function. Alternatively, the lens may be built from a prescription corrected telephoto lens and a variable magnifying lens.

In contrast to conventional eyeglasses, embodiments enable a single pair of eyeglasses to fully automatically correct vision for varying distances, such as near, middle, and far distance, and may further include telephoto and macro operation. In some embodiments, the eyeglasses may provide a vision corrected heads-up display function.

FIG. 1A is an illustration of an embodiment of autofocus eyeglasses including an implementation of a heads up display function. In some embodiments, autofocus eyeglasses 100 include components to interact directly with the human eye to fully automate prescription vision correction for varying distances, such as near distance, middle distance, and far distance gaze. In some embodiments, in addition to standard eyeglass elements, such as a frame 170, nose pads 105, and earpieces 175, the autofocus eyeglasses 100 includes the following components:

(1) One or more focus distance components 120 and 125, which may include an eye tracker or eye sensor, wherein an eye sensor is to measure lens width, lens thickness, or both.

In some embodiments, the focus distance components include an eye tracker that is to determine the point of gaze (where the user is looking) or to measure the relative distance of the object that the eye is trying to focus on. Eye tracking is the process of measuring either the point of gaze (where a user is looking) or the motion of an eye relative to the head. An eye tracker is a device for measuring eye positions and eye movement.

In some embodiments, eye tracking and point of gaze distance can be implemented using an algorithm that runs on a microcontroller that processes data from the camera of each focus distance component, wherein the cameras of the left and right elements look into the right and left eyes, respectively.

In some embodiments, the focus distance components include an eye sensor to measure width, thickness, or both of the lens of one or both eyes of a user of the eyeglasses. In some embodiments, the eye sensor is to view into either eye (or both eyes) and is to measure changes in lens width or thickness, with as measuring the lens width relative to the width when focusing on a near object.

(2) Variable focus right 110 and left 115 lenses that are operable to incorporate a prescription to correct vision for, as an example, near, far, and in-between distances. Variable focus lenses may include a mechanism for varying lens focal distance, where such mechanism may include, but is not limited to, known electro-optical and opto-mechanical lenses.

A conventional electro-optical mechanism commonly uses liquid crystals as an active lens medium, wherein a user may touch a control to trigger a current to change the orientation of molecules in the crystals, or a change in head position may cause a change in current to adjust the lenses.

A conventional set of opto-mechanical spectacles allow focus control by the wearer via, for example, movement of a small slider located on top of the bridge of the eyeglasses. The user adjusts the lens for optical clarity at the desired distance. Opto-mechanical lenses may be a combination of rigid and flexible lenses that can change prescription to enable sharp focus at different distances.

In some embodiments, autofocus eyeglasses may provide automatic adjustment of variable focus lenses, such as electro-optical and opto-mechanical lens mechanisms. In the case of an electro-optical lens, an actuator applies an electric current to the liquid to change the refraction of the liquid. In some embodiments, a controller, such as a microprocessor algorithm and associated hardware, can automatically control electro-optical variable focus lenses by applying a variable amount of current. In the case of an opto-mechanical lens, an actuator element, such as a motor, is included to enable automatic control of the focal length of the lens, such as a microprocessor based algorithm to control the lens focal length.

(3) A controller, such as a microprocessor, microcontroller, or specialized logic that implements a focus control algorithm, which is further described below.

(4) In some embodiments, a focus control algorithm implemented on, for example, a microprocessor that continuously processes the data from the distance determination elements and determines whether the lens focus needs to be changed to optimize vision. In some embodiments, the algorithm interacts directly as an extension to the human vision system. In some embodiments, the algorithm is in effect a coarse tuning outer loop algorithm that interacts intimately with the human vision system inner loop. For this reason, the algorithm operates to converge and be stable.

In some embodiments, the autofocus eyeglasses utilize a vision prescription of the user in controlling the focus of the eyeglasses. In some embodiments, the user may input known prescription information, such as information based on a separate optical evaluation of the user's eyes. In some embodiments, the autofocus eyeglasses may operate to determine some or all of the necessary prescription information for the user, such as in operation of a focus training mode. In some embodiments, the user's prescription information is used to set the variable focus lens at the correct focal length for the situation (such as near, medium, or far distance) in an automatic adjusting mode of the autofocus eyeglasses.

In some embodiments, an optional automatic focus training mode is provided, wherein the eyeglasses automatically learn the compensation necessary for an individual's unique prescription, and thus generate at least some of the prescription information for the user. In some embodiments, the process for the focus training mode may operate in the matter of an autorefractor (as referred to an automated refractor), an autorefractor being a computer-controlled machine that may be used during an eye examination, the autorefractor operating to provided an objective measurement of a person's refractive error and prescription for eyeglasses or contact lenses. In some embodiments, the focus training process is achieved by measuring how light is changed as it enters a user's eye, the eyeglasses projecting a known image onto the retina of a user (using a heads up display, for instance) to automatically measure the overall refractive error of the eye. In some embodiments, an inward looking camera, such as a portion of the distance determination component 120-125 or a separate camera, provides feedback on the distortion present in each eye. In some embodiments, eyeglasses may generate a wavefront distortion map for use in evaluating the vision of the user of the eyeglasses.

In some embodiments, an algorithm for a focus training process for the autofocus eyeglasses may include, for each of multiple views, such as views of objects that are near, medium, and far distances:

(a) Adjusting the lens to determine a setting that provides maximum visual clarity, the setting being a lens offset value; and (b) Saving the lens offset value for use in the automatic adjusting mode for the eyeglasses.

In some embodiments, the focus training mode may include menus that are provided to a user during a focus training process, wherein the focus training process may include the provision of alternative focus settings for a user and providing an inquiry to the user regarding which setting is better in order to hone in on an optimal prescription using a binary tree. An embodiment of a focus training process is illustrated in FIG. 5B. In some embodiments, the auto-prescription capability may be implemented in an external computer, and such external computer may be operable to automatically download a resulting prescription via wired or wireless communication to the eyeglasses.

Figure 1B:
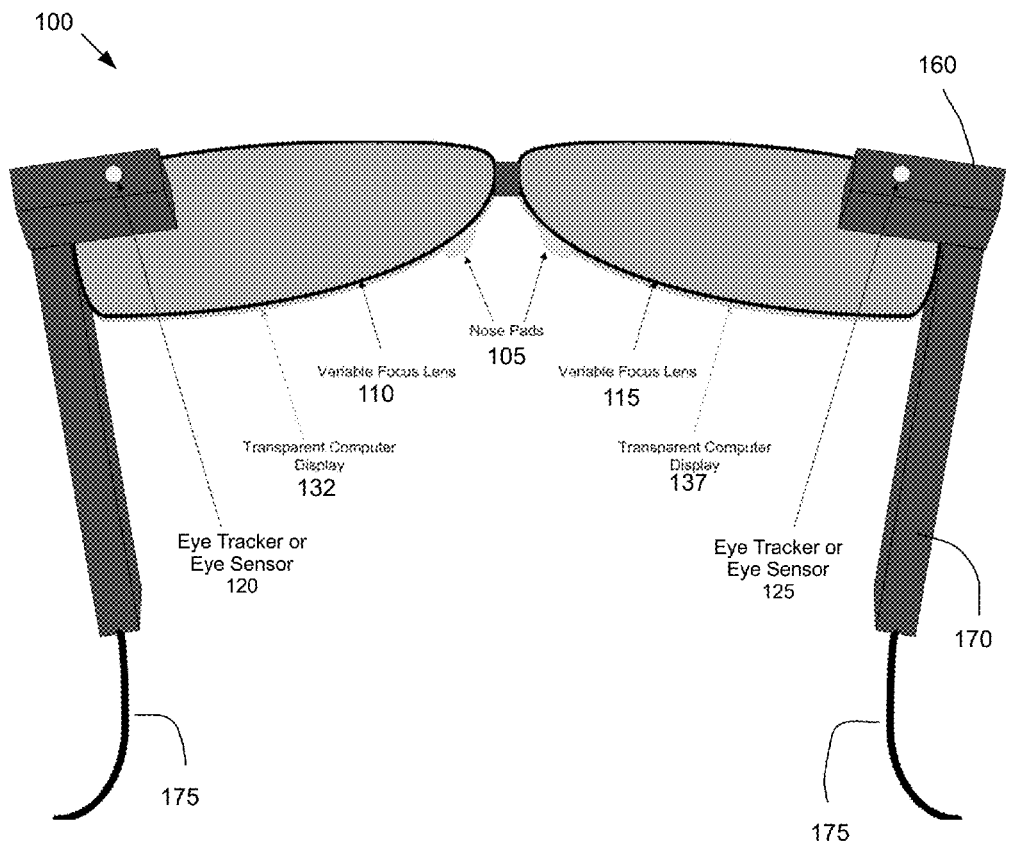
FIG. 1B is an illustration of an embodiment of autofocus glasses including a transparent lens computer display.
Figure 1C:
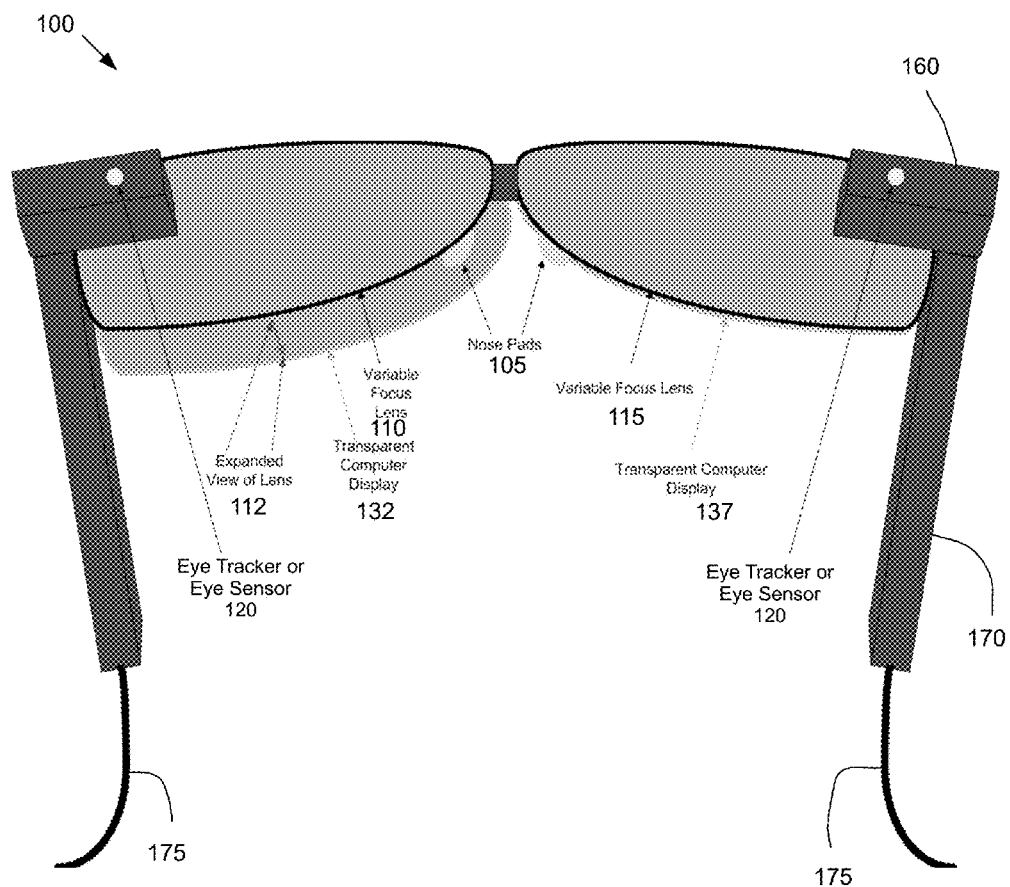
FIG. 1C is an illustration of an embodiment of autofocus glasses including a computer display with an exploded view of the lenses.

In some embodiments, the autofocus eyeglasses further include the following components:

(5) A projector 130 and 135 for one or both eyes to project through one or more prisms 140 and 145 to provide display functions. In some embodiments, because the focus of the lens is constantly changing with the detected focus distance of the user, the focus of the projectors 140-145 is also changed. In some embodiments, the change is be controlled by an algorithm that runs on the microcontroller or microprocessor to maintain a vision-corrected display at the main lens focal distance. An alternative embodiment including one or more transparent computer displays is illustrated in FIGS. 1B and 1C.

(6) A mechanism to support telephoto (which may be, for example, zoom telephoto, incremental telephoto, or single setting telephoto) and macro (which may be, for example, zoom macro, incremental macro, or a single setting macro) functions. In some embodiments, a mechanism may utilize a zoom prescription adjusted lens, and then apply the mechanisms described in items (1) through (4) above.

In some embodiments, the autofocus eyeglasses may include an activation mechanism for the telephoto or macro function, where the activation mechanism may include, for example, a switch on the eyeglass frame or a voice activation mechanism to select a telephoto function or a macro function. In some embodiments, autofocus eyeglasses may be operable to automatically switch to the telephoto or macro functions, such as by detecting that a viewer is attempting to focus on a distant object, resulting in activation of the telephoto function, or is attempting to focus on a very near object, resulting in activation of the macro function. In some embodiments, an associated algorithm may then change the focus setting on the lenses. In some embodiments, additional magnification is applied to implement the macro function. In some embodiments, for the telephoto function, a telephoto lens is used in conjunction with an additional electro-optical magnifying lens that magnifies to focus on closer objects.

(7) An outward facing telephoto or macro camera 160, including a telephoto or macro zoom camera, where outward facing refers to a camera facing away from the user, and may in particular face generally outward from the front of the autofocus eyeglasses. In some embodiments, an image generated by the telephoto or macro camera is projected through the projector 130-135. The telephoto or macro camera 160 may be used to, for example, capture still photographs, capture movie images, or provide a current telephoto or macro image to a user.

The autofocus eyeglasses 100 may include certain elements that are not illustrated in FIG. 1A that may be required for operation, including a battery or other power source, such as an near field inductive coupling; a charger input; a wireless power receiver if a battery is a rechargeable battery; and an on-off switch to enable and disable the eyeglasses, which may, for example be a switch that automatically turns on when the eyeglasses are put on or are unfolded. In some embodiments, the autofocus eyeglasses 100 include wireless or wired communications mechanisms for communication between the eyeglasses 100 and an external device. Components of an embodiment of autofocus eyeglasses are further illustrated in FIG. 4.

FIG. 1B is an illustration of an embodiment of autofocus eyeglasses including a computer display. In some embodiments, in addition to other components, the autofocus eyeglasses 100 include one or more transparent computer displays, such as the illustrated transparent computer displays 132 and 137. In some embodiments, rather than utilizing one or more computer projectors 130-135 and prisms 140-145 for the projection of images to a user, the eyeglasses include the one or more transparent computer displays 132-137 for the presentation of images, wherein the transparent computer displays 132-137 are sized and positioned as lenses of the autofocus eyeglasses. In some embodiments, the transparent computer displays 132-137 are a similar size and shape as the variable focus lenses 110-115 and are arranged in close proximity to the variable focus lenses 110-115 such that variable focus lens 110 and transparent computer display 132 form a first lens group and variable focus lens 115 and transparent computer display 137 form a second lens group. Each of the one or more transparent computer displays 132-137 may include, but is not limited to, an OLED (organic light-emitting diode) display.

FIG. 1C is an illustration of an embodiment of autofocus eyeglasses including a computer display. As illustrated, rather than utilizing one or more computer projectors 130-135 and prisms 140-145 for the projection of images to a user, the eyeglasses include one or more transparent computer displays 132-137 for the presentation of images. In this illustration, an expanded view 112 of the first lens group is provided, showing the variable focus lens 110 and transparent computer display 132. The expanded view 112 is not according to scale, but rather is intended to better illustrate the individual components of the lens groups of the autofocus eyeglasses 100.

Figure 2:
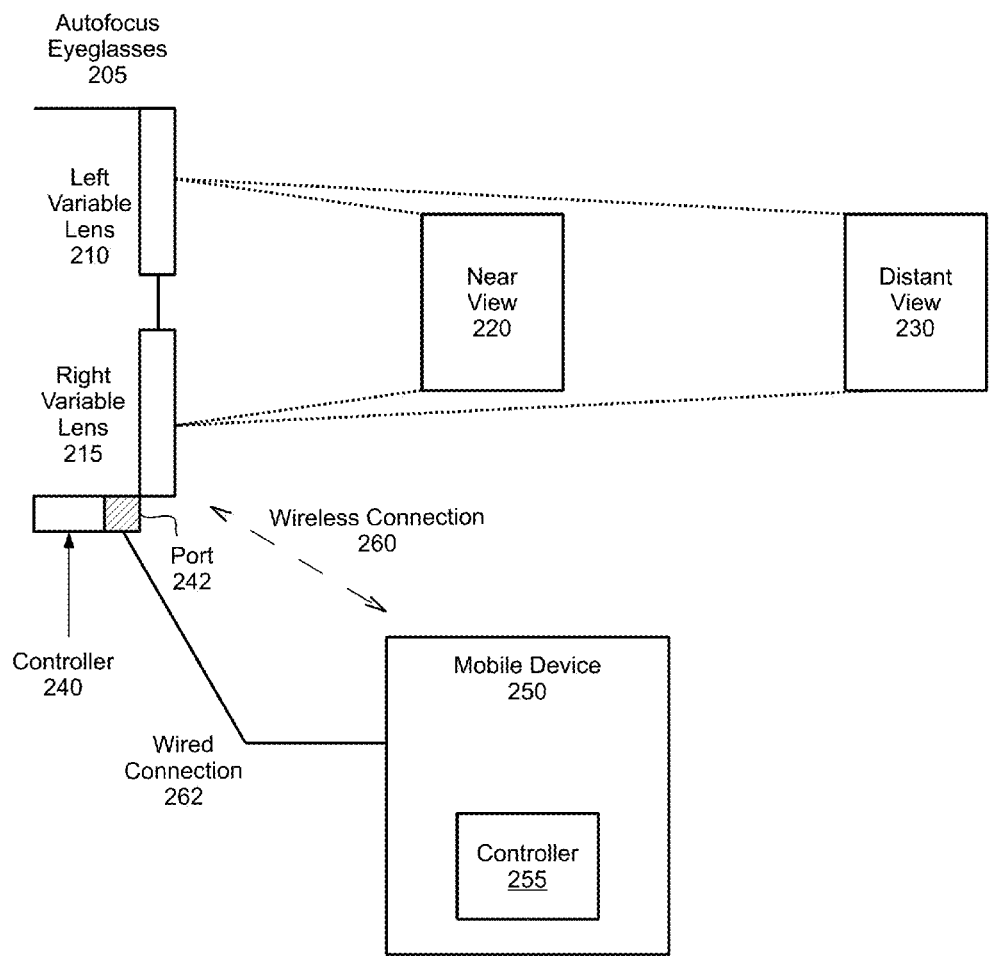
FIG. 2 illustrates operation of autofocus eyeglasses according to an embodiment.

FIG. 2 illustrates operation of autofocus eyeglasses according to an embodiment. In this illustration, autofocus eyeglasses provide for prescription controlled automatic focus. For ease of illustration, all components of the autofocus eyeglasses are not illustrated. In this illustration, the autofocus eyeglasses include a left variable focus lens 210 and a right variable focus lens 215. In some embodiments, the left and right variable focus lenses 210-215, which may be independently controllable, change focus automatically in response to the focus distance of the user of the eyeglasses 205. As described further above, the variable focal length of the lenses may be implemented using, for example, electro-optical or opto-mechanical mechanisms.

In some embodiments, the autofocus eyeglasses detect the focus distance of the eyes of a user, such as whether the user is focusing on a near view 220 or a distance view 230. In some embodiments, the variable focus lenses 210-215 change focal length in response to the detected focus distance under the control of a controller, where the controller may be a local controller 240 that is a part of the autofocus eyeglasses or may be a controller 255 of an external apparatus, such as a mobile device 250. In some embodiments, the eyeglasses may be in communication with the external apparatus by a wireless connection 260 or a wired connection 262, such as via port 242.

Figure 3:
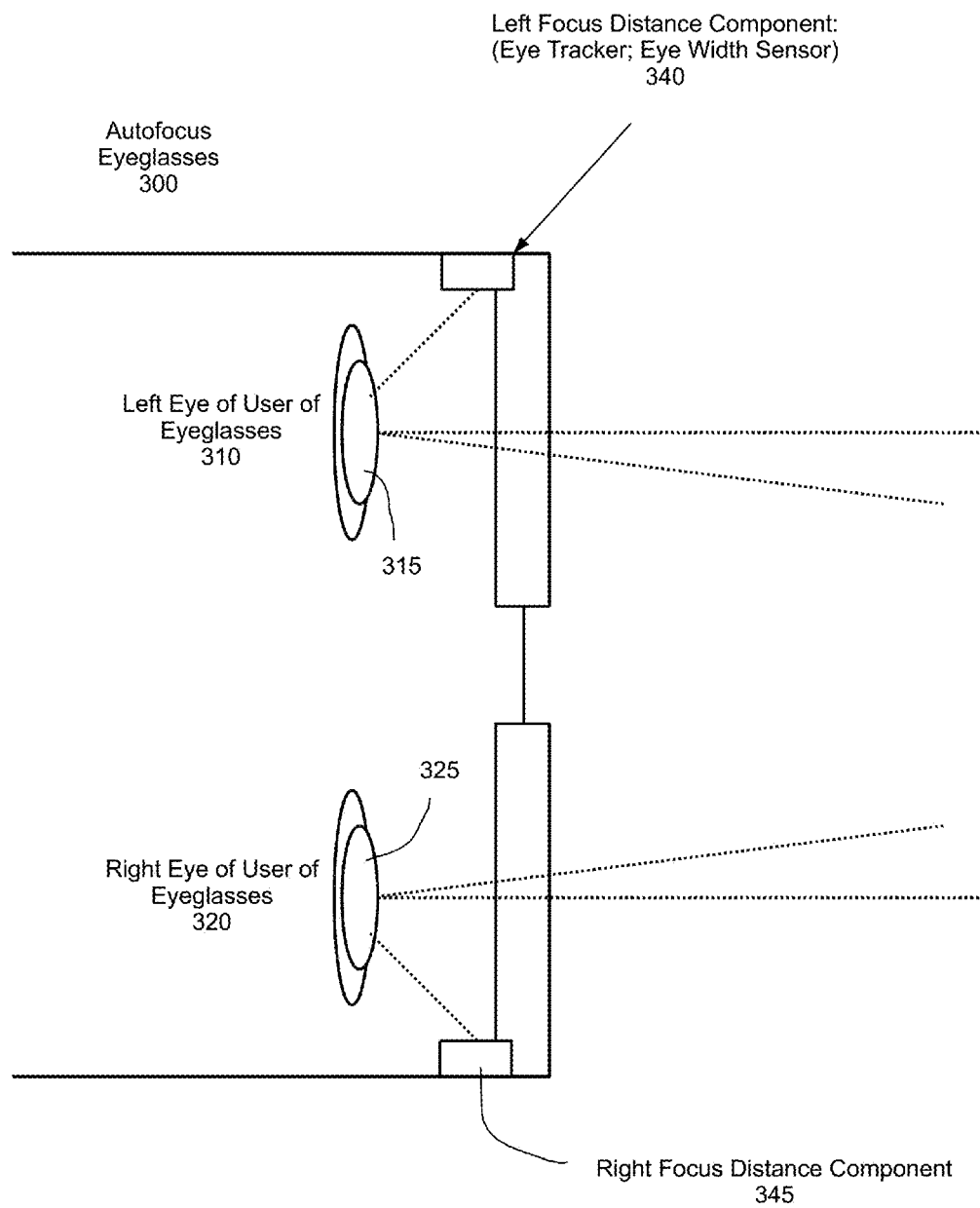
FIG. 3 is an illustration of focus distance determination for autofocus eyeglasses according to an embodiment.

FIG. 3 is an illustration of focus distance determination for autofocus eyeglasses according to an embodiment. In some embodiments, autofocus eyeglasses 300 include focus distance components to determine a focus distance of the eyes of a user of the eyeglasses. For example, autofocus eyeglasses 300 may include a left focus distance component 340 to detect focus distance information from a left eye of a user of the eyeglasses 310 and a right focus distance component 345 to detect focus distance information from a right eye of the user of the eyeglasses 300.

In some embodiments, the left and right focus distance components 340-345 may include one or more of an eye tracker and an eye sensor, wherein an eye sensor is to measure lens width, lens thickness, or both of an eye of the user. In some embodiments, each eye tracker determines eye position of the eyes 310 and 320 of the user. In some embodiments, the autofocus eyeglasses may determine a focus distance by determining a distance of an object that the user is viewing. In some embodiments, the autofocus eyeglasses may determine a focus distance using the relative angle of view of each of the eyes, where the view of each of the eyes will be roughly parallel for distance viewing and will converge at a point for focusing on closer objects. In some embodiments, an algorithm provides for continually checking the position of the eyes of the user and in response choosing an appropriate focus setting of the variable focus lens.

In some embodiments, each eye sensor may determine a relative width or thickness of the left lens 315 and right lens 325 of the eyes of the user, where the relative width or thickness of the lens is indicative of a distance of focus of the eyes 310 and 320 of the user. In some embodiments, the eye sensors continuously measure whether the lens has a flattened shape and therefore has a larger diameter or width (far distance focus) or is thickened (near distance focus) and therefore has a smaller diameter or width. In some embodiments, the sensors allow for whether a person is attempting to view something close, far away, or somewhere in between. In some embodiments, the eye sensors include a camera to view the eyes of the user. In some embodiments, an algorithm provides for continually checking the width or thickness of the lenses 315 and 325 of the eyes 310 and 320 and in response choosing an appropriate focus setting of the variable focus lens.

Figure 4:
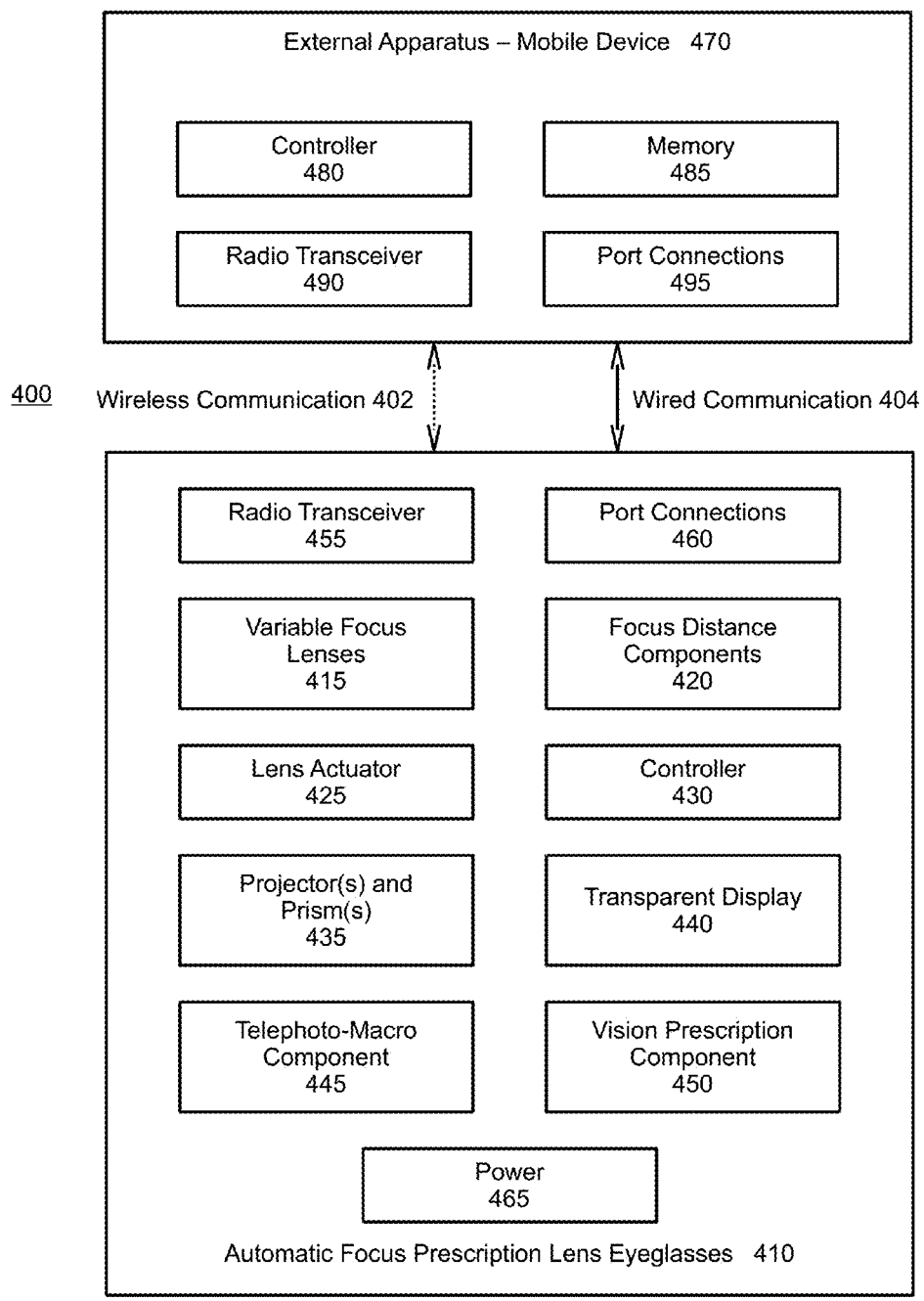
FIG. 4 is an illustration of automatic focus prescription lens eyeglasses according to an embodiment.

FIG. 4 is an illustration of automatic focus prescription lens eyeglasses according to an embodiment. In some embodiments, automatic focus prescription lens eyeglasses 410 may operate independently, and in some embodiments the eyeglasses 410 operation in a system 400 with an external apparatus 470, such as a mobile device, for one or more functions of the eyeglasses 410. In some embodiments, automatic focus prescription lens eyeglasses 410 (which are illustrated in terms of included components without regard to the actual shape of the eyeglasses) include one more variable focus lenses 415, such as lenses 110 and 115 illustrated in FIGS. 1A to 1C. In some embodiments, the variable focus lenses may include either electro-optical lenses or opto-mechanical lenses.

In some embodiments, the eyeglasses 410 further include one or more focus distance components 420 to determine information regarding the focus distance of the eyes of a user of the eyeglasses 410. In some embodiments, the focus distance components may include an eye tracker to detect direction of gaze of a user. In some embodiments, the focus distance components may include an eye sensor to detect information regarding a relative width or thickness of a lens of an eye of a user of the eyeglasses 410. In some embodiments, the eyeglasses may perform an eye characteristic training process to determine lens width or thickness values at different distances for a particular user. An embodiment of an eye characteristic training process is illustrated in FIG. 5C.

In some embodiments, the eyeglasses include one or more lens actuators 425, where the lens actuator 425 of each variable focus lens operates to change the focal distance of the variable focus lens 415. In some embodiments, a lens actuator 425 may be a component to change current for an electro-optical lens, or a component and a motor or other similar drive components to change the focal distance of the electro-mechanical lens.

In some embodiments, the eyeglasses 410 include a controller 430 to control the operation of the eyeglasses 410, including determination of when the focal length of the variable focus lenses 415 should change, and to control the lens actuators to implement the change in focal length. In some embodiments, a controller for the eyeglasses 410 may be a controller 480 of the external apparatus 470.

In some embodiments, the eyeglasses 410 include one or more projectors for the projection of images and one or more prisms to direct the image of each of the one or more projectors to one or both eyes of a user 435. In some embodiments, the eyeglasses may include one or more transparent displays 440 for the display of images for a user.

In some embodiments, the eyeglasses 410 may further include a telephoto component, macro components, or both such components 445. In some embodiments, the telephoto-macro component 445 may include an additional lens to allow for a telephoto or macro function, which may include zoom operation for the telephoto or macro function. In some embodiments, the telephoto-macro component 445 may include an actuation element to turn the telephoto or macro function on or off on the command of a user of the eyeglasses. In some embodiments, the eyeglasses 410 may be operable to automatically switch to the telephoto or macro component 445, such as by detecting that a viewer is attempting to focus on a distant object, resulting in activation of the telephoto function, or is attempting to focus on a very near object, resulting in activation of the macro function.

In some embodiments, the eyeglasses 410 may be operable to switch to telephoto operation through voice command or touching the eyeglasses or other gesture including hands-free gestures. In some embodiments, the telephoto operation may be implemented by the processor changing the actuator settings to increase the zoom In some embodiments, the eyeglasses 410 include a vision prescription component 450. In some embodiments, the vision prescription component 450 may include a memory to hold prescription information for the user. In some embodiments, the vision prescription component may further include elements for a focus training sequence for the eyeglasses 410, wherein the training sequence may allow the eyeglasses to determine one or more prescription settings for the user, where the prescription settings provide an offset for settings of the variable focus lenses 415. The focus training sequence may be as described in the process illustrated in FIG. 5B.

In some embodiments, the autofocus eyeglasses 410 include a power component 465 to power the operation of the eyeglasses, wherein the power component may include a battery, a solar cell, a fuel cell, a charged capacitor, near field inductive coupling, or other system or device for providing or generating power in an apparatus.

Figure 6:
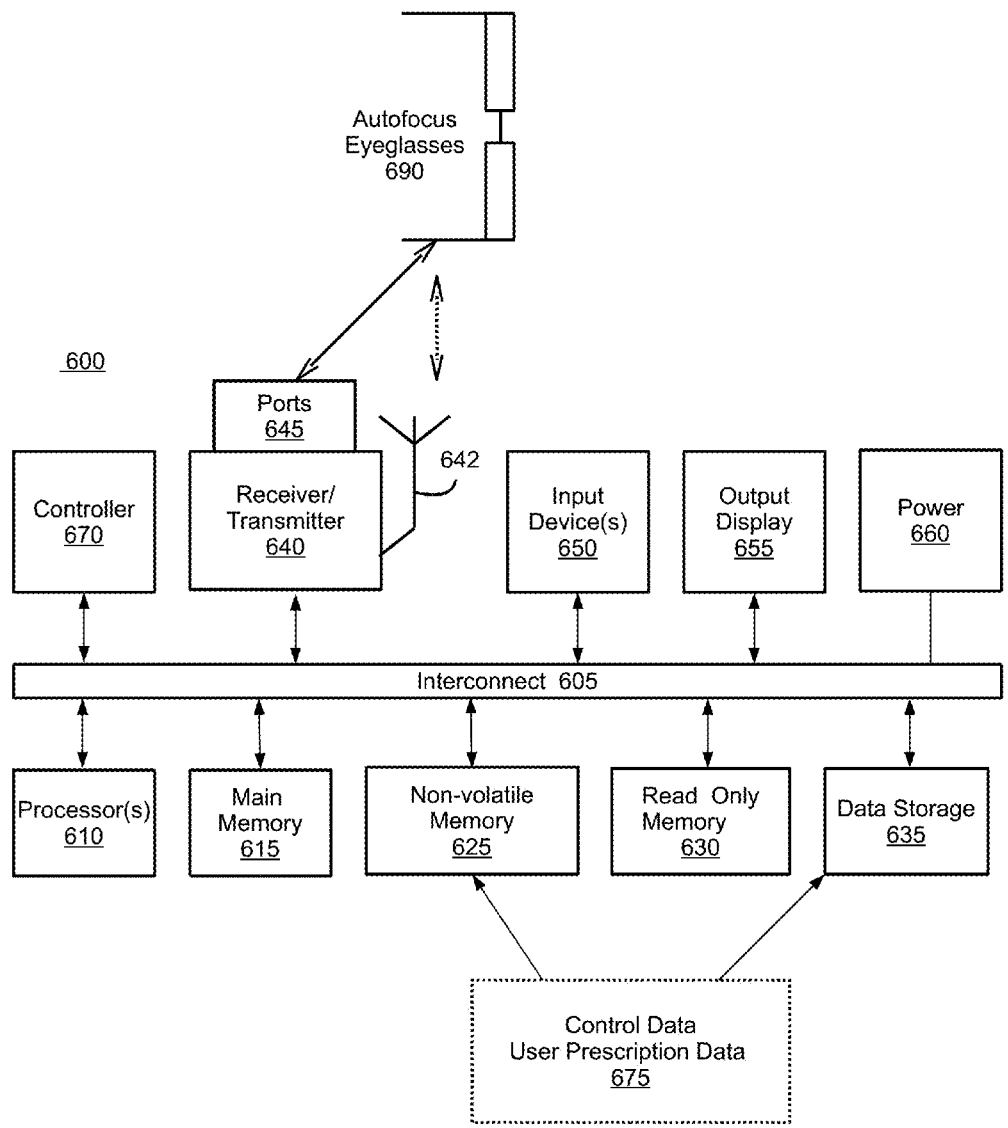
FIG. 6 illustrates an apparatus or system to operate cooperatively with autofocus eyeglasses according to an embodiment.

In some embodiments, the eyeglasses 410 further include a radio transceiver 455 for wireless communication 402 with the external apparatus 470. In some embodiments, the eyeglasses 410 include one or more port connections 460 for wired communication 404 with the external apparatus 470. In some embodiments, the eyeglasses 410 may provide data to the external apparatus 470 and may receive commands and setting information from the external apparatus 470. In some embodiments, the external apparatus 470 includes a controller 480 to provide processing or commands for at least some functions of the autofocus eyeglasses 410. In some embodiments, the external apparatus 470 further includes a radio transceiver 490 for wireless communication 402 with the eyeglasses 410. In some embodiments, the external apparatus includes one or more port connections 495 for wired communication 404 with the eyeglasses 410. In some embodiments, the external apparatus 470 further includes a memory 485 to hold data connected with the operation of the eyeglasses 410, which may include, for example, visions prescription regarding the user of the eyeglasses if the user inputs this information for operation of the eyeglasses 410. Other components of the external apparatus 470 may be as illustrated in FIG. 6.

Figure 5A:
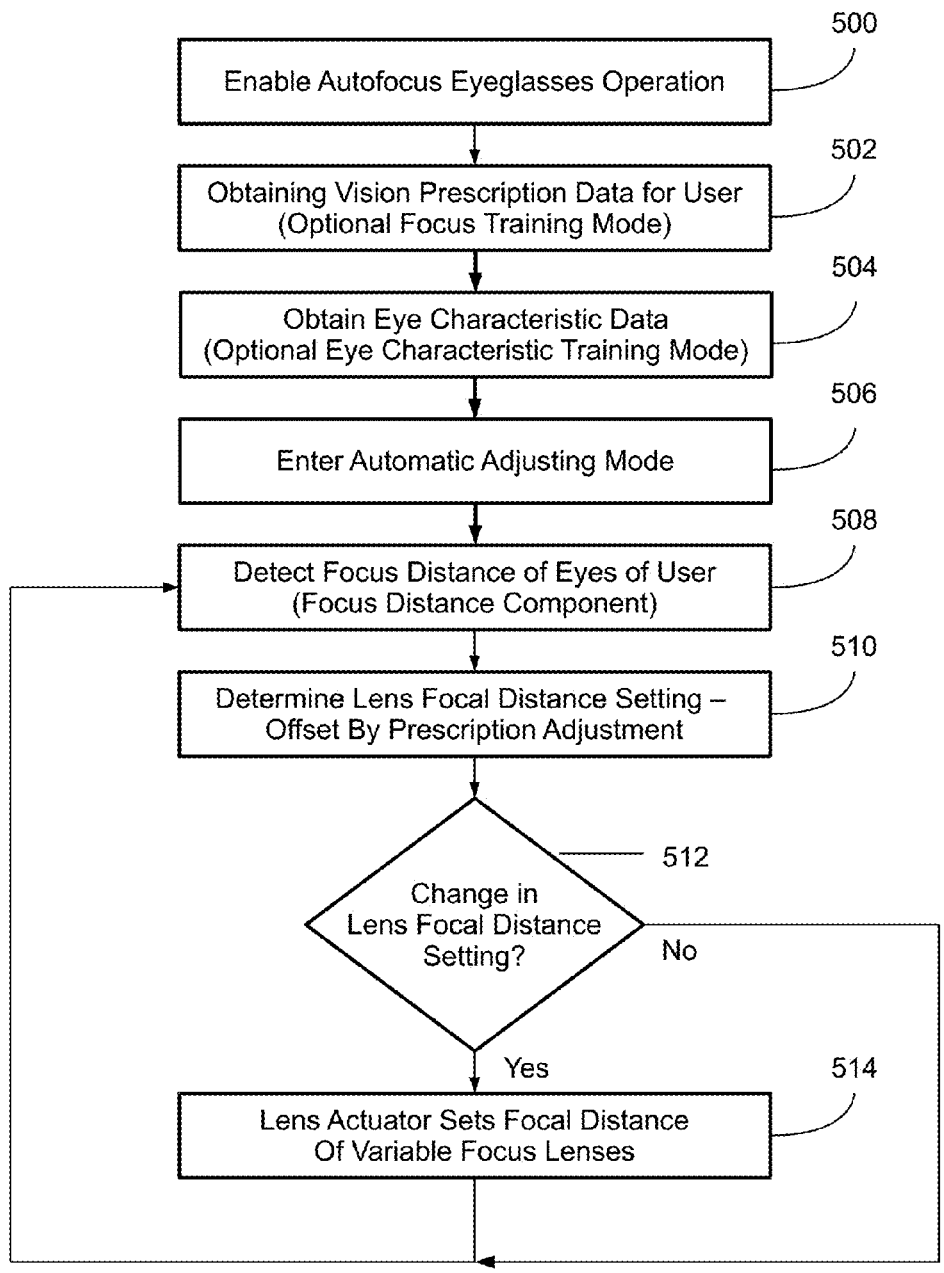
FIG. 5A is a flow chart to illustrate an embodiment of a process for autofocus eyeglasses operation.
Figure 5B:
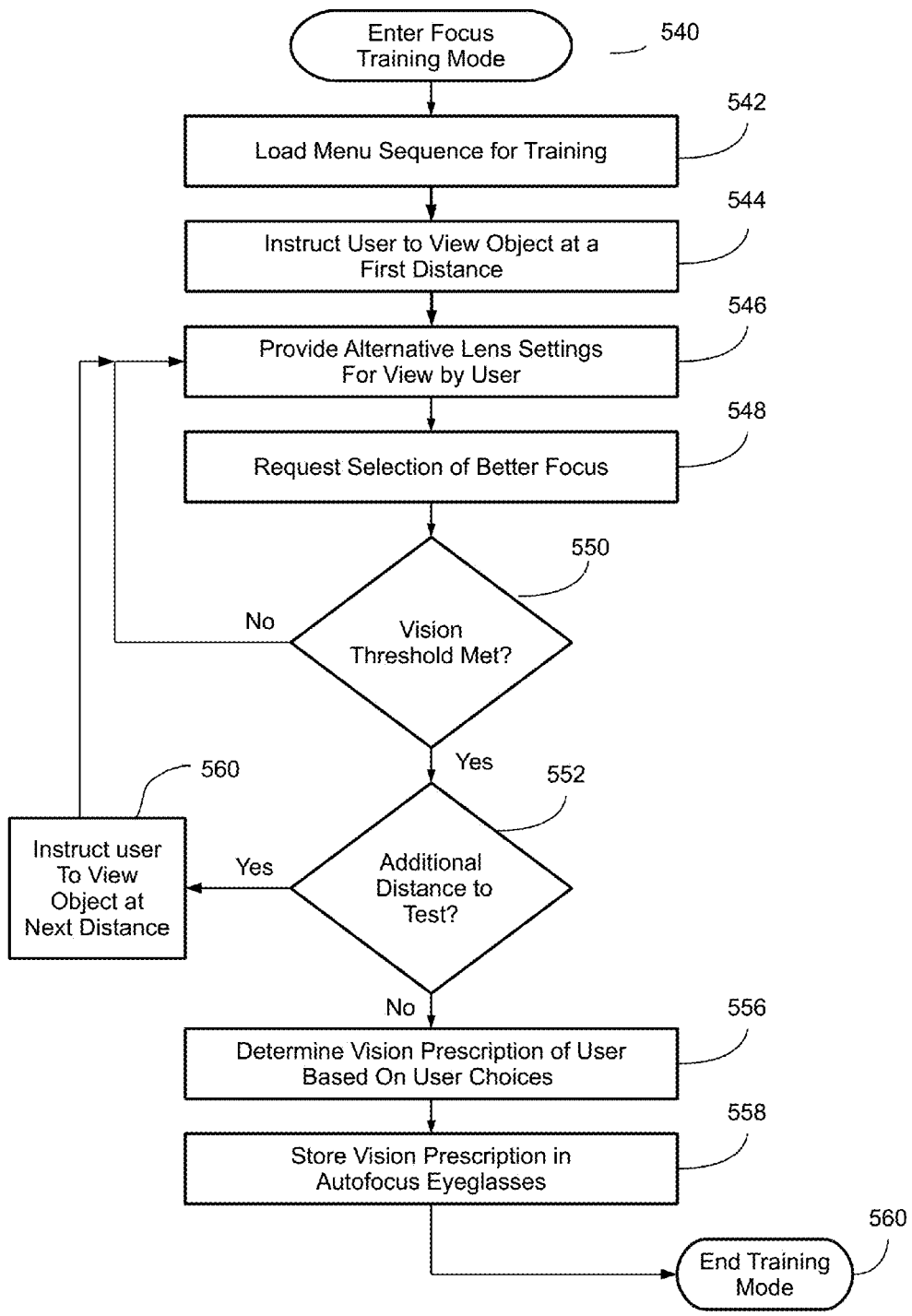
FIG. 5B is a flow chart to illustrate an embodiment of a process for a focus training mode of autofocus eyeglasses.
Figure 5C:
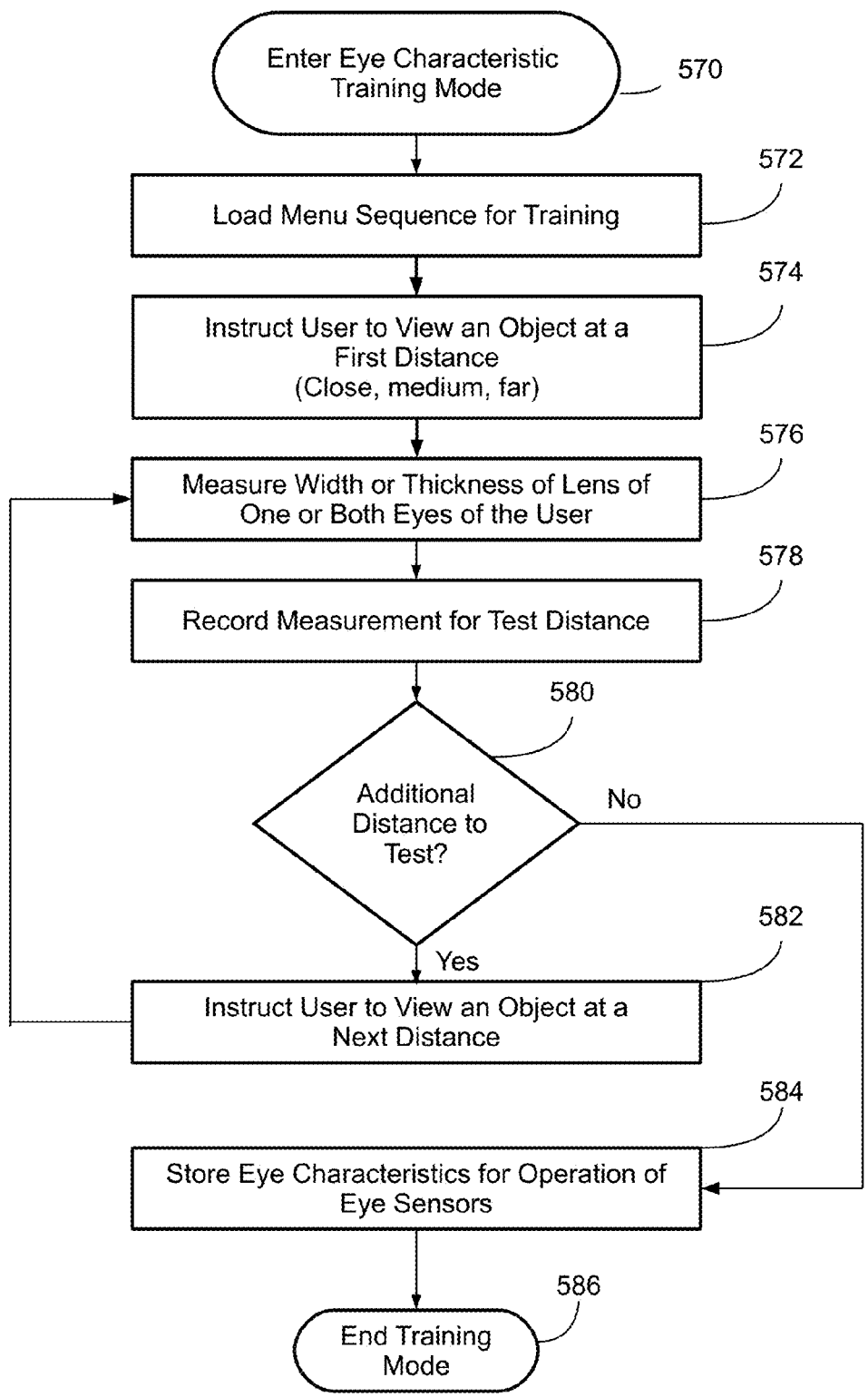
FIG. 5C is a flow chart to illustrate an embodiment of a process for an eye characteristic training mode of autofocus eyeglasses.

FIG. 5A is a flow chart to illustrate an embodiment of a process for autofocus eyeglasses operation. In some embodiments, the eyeglasses enable operation 500, such as in response to an on-off switch being switched to an on position or in response to the eyeglasses being put on or being unfolded if the on-off switch is an automatic switch. In some embodiments, the eyeglasses may obtain vision prescription data for the user 502, which may include loading existing vision prescription data or generating new vision prescription data. In some embodiments, the vision prescription data may be provided to the eyeglasses such as via a remote device in response to a user inputting the vision prescription information. In some embodiments, the eyeglasses may generate vision prescription data through an optional training mode in which the autofocus eyeglasses determine vision information for the user 502. An embodiment of a focus training process is illustrated in FIG. 5B. The focus training process may only be required during a first use of the eyeglasses by a user or to re-test vision for a user, such as if the user's vision has changed.

In some embodiments, the eyeglasses may obtain eye characteristic data for the user 504, where the eye characteristic data may include the lens width or thickness of one or both eyes of the user at certain distances for use in operation of an eye sensor that measures lens width or thickness, such as eye sensors 120-125 illustrated in FIGS. 1A-1C. In some embodiments, the eye characteristic data may be obtained through an optional eye characteristic training process. An embodiment of an eye characteristic training process is illustrated in FIG. 5C. The eye characteristic training process may only be required during a first use of the eyeglasses by a user or to re-test eye characteristics for a user.

In some embodiments, the eyeglasses enter the automatic adjusting mode of the eyeglasses 506. In some embodiments, the eyeglasses operate to detect the focus distance of the eyes of the user 508, where the detection of focus distance utilizing one or more focus distance components of the autofocus eyeglasses. The focus distance components may include one of an eye tracker and an eye sensor, such as elements 120 and 125 illustrated in FIGS. 1A to 1C.

In some embodiments, in response to the detection of the focus distance of the eyes of the user, a lens focal distance setting is determined 510, where the focal distance setting may be offset by a prescription adjustment based upon the vision prescription of the user. In some embodiments, if there is a change from the current lens focal distance setting 512, then in response to the change a lens actuator for each lens under the direction of a controller sets the focal distance of each variable focus lens 514.

In some embodiments, the autofocus eyeglasses may further include a macro function, a telephoto function, or both. If there is a command or action to turn on the macro or telephoto function, the function is enabled if currently disabled, and if there is command or action to turn off the macro or telephone function, the function is disabled if currently enabled. In some embodiments, the autofocus eyeglasses operate over a range of zoomed focal distances by continuously detecting user gaze distance to adjust the amount of the telephoto zoom. Similarly, in some embodiments, the autofocus eyeglasses operate over a range of zoomed macro focal distances by continuously detecting user gaze distance to adjust the amount of the macro zoom.

In some embodiments, the autofocus eyeglasses continue with continuous detection of the focus distance of the eyes of the user 508 and the following determination of lens focal distance setting 510 and setting of focal distance of the variable focus lenses 514 while the eyeglasses remain active in the automatic focusing mode.

FIG. 5B is a flow chart to illustrate an embodiment of a process for a focus training mode of autofocus eyeglasses. In some embodiments, upon the eyeglasses entering a training mode 540, a menu sequence for training is loaded to guide a user through the focus training process 542. In some embodiments, the eye glasses may instruct the user to view an object at a first distance 544. In some embodiment, the view may be of symbols or images generated by the eyeglasses that assist a viewer in determining whether an image is in focus. In some embodiments, a set of views with alternative lens settings are provided to the viewer 546, where the set of view may include a first view at a first focus setting and a second view at a second focus setting. In some embodiments, a request is provided to the viewer to choose one view of the set of views as being better focused 548.

In some embodiments, if a certain vision threshold for the testing is not yet met 550, the process continues with provision of alternative lens settings 546 to continue working towards an optimal focus setting for the distance. In some embodiments, if the vision threshold is met 550, then, if there is an additional distance to test 552, then the user is instructed to view an object at a next distance 560, with the processing returning to providing images with alternative lens settings for view by the user 546. In some embodiments, if there are no more additional distances to test 552, then the vision prescription of the user is determined based on the user choices of focus settings 556, the determined vision prescription is stored in the autofocus eyeglasses 558 or in a companion device, and the training mode is ended 560.

FIG. 5C is a flow chart to illustrate an embodiment of a process for an eye characteristic training mode for autofocus eyeglasses. In some embodiments, upon entering the eye characteristic training mode 570, a menu sequence for the training is loaded. In some embodiments, the eyeglasses instruct the use (such as by a visual or audio instruction) to view an object at a first distance 574. In some embodiments, the distances may be a certain number of general distances, such as, in one example. a close distance that is less than 16 inches from the user; a medium distance that is between 16 inches and 8 feet from the user; and a far distance that is beyond 8 feet from the user.

In some embodiments, an eye sensor measures a width or thickness of a lens of one or both eyes of the user 576 and the measurement is recorded for the distance 578. If there is an additional distance to test 580, then the user is instructed to view an object at the new distance 582, and continue with measuring width or thickness of the lens of one or both eyes of the user 574. If there are no additional distances to test 580, then the determined eye characteristics are stored for the operation of eye sensors in determining a distance of gaze for the user 584, and the training mode is ended 586.

FIG. 6 illustrates an apparatus or system to operate cooperatively with autofocus eyeglasses according to an embodiment. In this illustration, certain standard and well-known components that are not germane to the present description are not shown. Elements shown as separate elements may be combined, including, for example, an SoC (System on Chip) combining multiple elements on a single chip.

In some embodiments, an external apparatus 600 may be a mobile device that may work cooperatively with autofocus eyeglasses 690. The autofocus eyeglasses 690 may be eyeglasses 100 illustrated in FIGS. 1A to 1C. In some embodiments, the external apparatus 600 may operate to receive and transmit data with the autofocus eyeglasses 690. In some embodiments, the external apparatus 600 includes one or more controllers and or signal processors for control of and processing for at least some operations of the eyeglasses 690. For example, the external apparatus 600 may be operable to perform one or more of receiving prescription information from a user and transmitting the prescription information to the autofocus eyeglasses; performing at least some of the processing required to determine focus distance of a user and determine and implement the appropriate focal distance settings for the variable focus lenses of the autofocus eyeglasses; and receive and display status information relating to the autofocus eyeglasses.

Under some embodiments, the external apparatus 600 includes an interconnect or crossbar 605 or other communication means for transmission of data. The interconnect 605 is illustrated as a single interconnect for simplicity, but may represent multiple different interconnects or buses and the component connections to such interconnects may vary. The interconnect 605 shown in FIG. 6 is an abstraction that represents any one or more separate physical buses, point-to-point connections, or both connected by appropriate bridges, adapters, or controllers.

The external apparatus 600 may include a processing means such as the one or more processors 610 coupled to the interconnect 605 for processing information. The processors 610 may comprise one or more physical processors and one or more logical processors. In some embodiments, the external apparatus 600 may further include a separate controller 670 for operation with the autofocus eyeglasses.

In some embodiments, the external apparatus 600 includes one or more transmitters or receivers 640 coupled to the interconnect 605. In some embodiments, the external apparatus 600 may include one or more antennas 642 for the transmission and reception of data via wireless communication. In some embodiments, the external apparatus includes one or more ports 645 for the transmission and reception of data via wired communications. In some embodiments, the data that is transmitted and received includes data transmitted to and received from the autofocus eyeglasses 690.

In some embodiments, the external apparatus 600 further comprises a random access memory (RAM) or other dynamic storage device or element as a main memory 615 for storing information and instructions to be executed by the processors 610. The external apparatus 600 may include one or more non-volatile memory elements 625, including, for example, flash memory, for the storage of certain elements. The external apparatus 600 also may comprise a read only memory (ROM) 630 or other static storage device for storing static information and instructions for the processors 610, and data storage 635, such as a solid state drive, for the storage of data. In some embodiments, memory of the external apparatus 600, such as the non-volatile memory 625 or data storage 635, may include storage of control data 675, including possible user prescription data, for the operation of the autofocus eyeglasses 690.

In some embodiments, the external apparatus 600 includes one or more input devices 650 for the input of data, including hard and soft buttons, a joy stick, a mouse or other pointing device, voice command system, or gesture recognition system. In some embodiments, the external device 600 includes an output display 655, where the display 655 may include a liquid crystal display (LCD) or any other display technology, for displaying information or content to a user. In some environments, the display 655 may include a touch-screen that is also utilized as at least a part of an input device 650. In some embodiments, the external apparatus 600 is operable to receive control data from a user via the input devices 650, including the input of prescription data for the user for transmission to the autofocus eyeglasses.

The external apparatus 600 may also comprise a battery or other power source 660, which may include a solar cell, a fuel cell, a charged capacitor, near field inductive coupling, or other system or device for providing or generating power in an external apparatus. The power provided by the power source 660 may be distributed as required to elements of the external apparatus 600.

In the description above, for the purposes of explanation, numerous specific details are set forth in order to provide a thorough understanding of the described embodiments. It will be apparent, however, to one skilled in the art that embodiments may be practiced without some of these specific details. In other instances, well-known structures and devices are shown in block diagram form. There may be intermediate structure between illustrated components. The components described or illustrated herein may have additional inputs or outputs that are not illustrated or described.

Various embodiments may include various processes. These processes may be performed by hardware components or may be embodied in computer program or machine-executable instructions, which may be used to cause a general-purpose or special-purpose processor or logic circuits programmed with the instructions to perform the processes. Alternatively, the processes may be performed by a combination of hardware and software.

Portions of various embodiments may be provided as a computer program product, which may include a computer-readable medium having stored thereon computer program instructions, which may be used to program a computer (or other electronic devices) for execution by one or more processors to perform a process according to certain embodiments. The computer-readable medium may include, but is not limited to, magnetic disks, optical disks, compact disk read-only memory (CD-ROM), and magneto-optical disks, read-only memory (ROM), random access memory (RAM), erasable programmable read-only memory (EPROM), electrically-erasable programmable read-only memory (EEPROM), magnet or optical cards, flash memory, or other type of computer-readable medium suitable for storing electronic instructions. Moreover, embodiments may also be downloaded as a computer program product, wherein the program may be transferred from a remote computer to a requesting computer.

Many of the methods are described in their most basic form, but processes can be added to or deleted from any of the methods and information can be added or subtracted from any of the described messages without departing from the basic scope of the present embodiments. It will be apparent to those skilled in the art that many further modifications and adaptations can be made. The particular embodiments are not provided to limit the concept but to illustrate it. The scope of the embodiments is not to be determined by the specific examples provided above but only by the claims below.

If it is said that an element "A" is coupled to or with element "B," element A may be directly coupled to element B or be indirectly coupled through, for example, element C. When the specification or claims state that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification or claim refers to "a" or "an" element, this does not mean there is only one of the described elements.

An embodiment is an implementation or example. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments, various features are sometimes grouped together in a single embodiment, figure, or description thereof for the purpose of streamlining the disclosure and aiding in the understanding of one or more of the various novel aspects. This method of disclosure, however, is not to be interpreted as reflecting an intention that the claimed embodiments requires more features than are expressly recited in each claim. Rather, as the following claims reflect, novel aspects lie in less than all features of a single foregoing disclosed embodiment. Thus, the claims are hereby expressly incorporated into this description, with each claim standing on its own as a separate embodiment.

In some embodiments, an apparatus, where the apparatus includes automatic focus eyeglasses, includes: one or more variable focus lenses; one or more actuators to change the focus of the variable focus lenses; and one or more focus distance components coupled to detect a focus distance of one or both eyes of a user of the apparatus. In some embodiments, the one or more actuators set a focal distance of each of the one or more variable focus lenses, a focal distance setting for each of the one or more variable focus lenses being determined in response to the focus distance of the one or both eyes of the user; and the focal distance setting for each of the one or more variable focus lenses includes adjustment for a vision prescription of the user.

In some embodiments, the apparatus further includes a controller to control at least some processes of the apparatus.

In some embodiments, the adjustment for a vision prescription of the user includes an adjustment for the user for a plurality of different distances.

In some embodiments, the apparatus further includes one or more of a transceiver to transmit and receive wireless communication data with an external apparatus or one or more ports to transmit and receive wired communication data with the external apparatus.

In some embodiments, the data received by the transceiver includes vision prescription data for the user.

In some embodiments, at least one of the one or more variable focus lenses is an opto-mechanical variable focus lens. In some embodiments, the actuator for the opto-mechanical lens includes a motor to adjust focus of the opto-mechanical lens.

In some embodiments, at least one of the one or more variable focus lenses is an opto-mechanical variable focus lens, wherein the actuator for the opto-mechanical lens includes a motor to adjust focus of the opto-mechanical lens.

In some embodiments, at least one of the one or more variable focus lenses is an electro-optical variable focus lens. In some embodiments, the actuator of the electro-optical lens includes a component to control a current to adjust a focus of the electro-optical lens.

In some embodiments, at least one of the one or more variable focus lenses is an electro-optical variable focus lens, wherein the actuator of the electro-optical lens includes a component to control a current to adjust a focus of the electro-optical lens.

In some embodiments, at least one of the one or more variable focus lenses is either: an opto-mechanical variable focus lens, wherein the actuator for the opto-mechanical lens includes a motor to adjust focus of the opto-mechanical lens; or an electro-optical variable focus lens, wherein the actuator of the electro-optical lens includes a component to control a current to adjust a focus of the electro-optical lens.

In some embodiments, at least one of the one or more focus distance components includes one or more eye trackers to determine a position of both eyes of the user.

In some embodiments, at least one of the one or more focus distance components includes an eye sensor to determine a width, a thickness, or both of a lens of an eye of the user.

In some embodiments, the apparatus includes a training mode to determine eye characteristics of the user for operation of the eye sensor.

In some embodiments, at least one of the one or more focus distance components includes an eye sensor to determine a width, a thickness, or both of a lens of an eye of the user, wherein the apparatus includes a training mode to determine eye characteristics of the user for operation of the eye sensor.

In some embodiments, the apparatus includes one or more of a macro function and a telephoto function. In some embodiments, the macro function or telephoto function includes a zoom function.

In some embodiments, the apparatus includes one or more of a macro function and a telephoto function, wherein the macro function or telephoto function includes a zoom function.

In some embodiments, the apparatus further comprises an outward facing camera, wherein the apparatus provides a macro function or telephoto function utilizing an image captured by the outward facing camera.

In some embodiments, the apparatus further includes one or more projectors to provide an image for the user.

In some embodiments, the apparatus includes one or more prisms to direct the image of each of the one or more projectors to one or more eyes of the user.

In some embodiments, the apparatus includes one or more transparent computer displays to provide an image for the user.

In some embodiments, the apparatus includes one or more of: one or more projectors to provide an image for the user and one or more prisms to direct the image of each of the one or more projectors to one or more eyes of the user; or one or more transparent computer displays to provide an image for the user.

In some embodiments, the apparatus includes a training mode to determine the vision prescription of the user.

In some embodiments, the apparatus further includes a frame, the one or more variable focus lenses and one or more focus distance components being coupled with the frame.

In some embodiments, a method for providing automatic focus for eyeglasses includes: obtaining vision prescription data for a user of automatic focus prescription lens eyeglasses; entering an automatic adjusting mode for the eyeglasses, the eyeglasses including one or more variable focus lenses; detecting a focus distance of one or both eyes of the user; determining a lens focal distance setting, wherein the lens focal distance setting is offset by a correction based on the vision prescription data for the user; and if the determined focal distance setting is different than a current focal distance setting for the eyeglasses, automatically changing the eyeglasses to the determined focal distance setting.

In some embodiments, obtaining vision prescription data includes loading received vision prescription data.

In some embodiments, obtaining vision prescription data includes a focus training process to determine a vision prescription for the user.

In some embodiments, the focus training process includes requesting the user to choose between varying focal distance settings.

In some embodiments, detecting a focus distance includes detecting a direction of gaze of both eyes of the user to determine a relative angle between the gazes of each eye.

In some embodiments, detecting a focus distance includes detecting a width or thickness of a lens of one or both eyes of the user.

In some embodiments, the method further includes performing an eye characteristic training process to determine lens width or thickness measurements for the user.

In some embodiments, detecting a focus distance includes detecting a width or thickness of a lens of one or both eyes of the user, and further comprising performing an eye characteristic training process to determine lens width or thickness measurements for the user.

In some embodiments, the method further includes enabling a telephoto function or macro function of the eyeglasses.

In some embodiments, enabling the telephoto function or macro function includes automatically enabling the telephoto function or macro function in response to detecting a distance at which the user is viewing.

In some embodiments, an apparatus for providing automatic focus for eyeglasses includes: a means for obtaining vision prescription data for a user of automatic focus prescription lens eyeglasses; a means for automatic adjustment for the eyeglasses, the eyeglasses including one or more variable focus lenses; a means for detecting a focus distance of one or both eyes of the user; a means for determining a lens focal distance setting, wherein the lens focal distance setting is offset by a correction based on the vision prescription data for the user; and a means for automatically changing the eyeglasses to the determined focal distance setting upon determining that the focal distance setting is different than a current focal distance setting for the eyeglasses.

In some embodiments, the means for obtaining vision prescription data includes a means for loading received vision prescription data.

In some embodiments, the means for obtaining vision prescription data includes a means for focus training to determine a vision prescription for the user.

In some embodiments, the means for focus training provides for requesting the user to choose between varying focal distance settings.

In some embodiments, the means for detecting a focus distance includes a means for detecting a direction of gaze of both eyes of the user to determine a relative angle between the gazes of each eye.

In some embodiments, the means for detecting a focus distance includes a means for detecting a width or thickness of a lens of one or both eyes of the user.

In some embodiments, the apparatus further includes a means for an eye characteristic training to determine lens width or thickness measurements for the user.

In some embodiments, the means for detecting a focus distance includes a means for detecting a width or thickness of a lens of one or both eyes of the user, and further comprising a means for eye characteristic training to determine lens width or thickness measurements for the user.

In some embodiments, an apparatus further includes a means for enabling a telephoto function or macro function of the eyeglasses.

In some embodiments, the means for enabling the telephoto function or macro function includes a means for automatically enabling the telephoto function or macro function in response to detecting a distance at which the user is viewing.

In some embodiments, a system for providing automatic focus for eyeglasses includes: automatic focus prescription lens eyeglasses including: a one or more variable focus lenses; one or more actuators to change the focus of the variable focus lenses, one or more focus distance components coupled with the frame to detect a focus distance of one or both eyes of a user of the apparatus, and at least one of a wireless transceiver for wireless communication or a communication port for wired communications; and an external apparatus to operate cooperatively with the eyeglasses, the external apparatus including: at least one of a wireless transceiver for wireless communication or a communication port for wired communications, a controller to control at least some operations relating to the eyeglasses, and a memory to store data. In some embodiments, the one or more actuators set a focal distance of each of the one or more variable focus lenses, a focal distance setting for each of the one or more variable focus lenses being determined in response to the focus distance of the one or both eyes of the user. In some embodiments, the focal distance setting for each of the one or more variable focus lenses includes adjustment for a vision prescription of the user.

In some embodiments, the adjustment for a vision prescription of the user includes an adjustment for the user for a plurality of different distances.

In some embodiments, the one or more variable focus lenses include at least one of an opto-mechanical variable focus lens and an electro-optical variable focus lens.

In some embodiments, the one or more focus distance components include at least one of an eye tracker to determine a position of an eye of the user or an eye sensor to determine a width or a thickness of a lens of an eye of the user.

In some embodiments, the system includes a training mode to determine eye characteristics of the user for operation of the eye sensor.

In some embodiments, the one or more focus distance components include at least one of an eye tracker to determine a position of an eye of the user or an eye sensor to determine a width or a thickness of a lens of an eye of the user, wherein the system includes a training mode to determine eye characteristics of the user for operation of the eye sensor.

In some embodiments, wherein the eyeglasses include one or more of a macro function and a telephoto function.

In some embodiments, the system includes at least one of: one or more projectors to provide an image for the user one or more prisms to direct the image of each of the one or more projectors to one or both eyes of the user; or one or more transparent computer displays to provide an image for the user.

In some embodiments, the system includes a training mode to determine the vision prescription of the user.

In some embodiments, a non-transitory computer-readable storage medium having stored thereon data representing sequences of instructions that, when executed by a processor, cause the processor to perform operations comprising: obtaining vision prescription data for a user of automatic focus prescription lens eyeglasses; entering an automatic adjusting mode for the eyeglasses, the eyeglasses including one or more variable focus lenses; detecting a focus distance of one or both eyes of the user; determining a lens focal distance setting, wherein the lens focal distance setting is offset by a correction based on the vision prescription data for the user; and if the determined focal distance setting is different than a current focal distance setting for the eyeglasses, automatically changing the eyeglasses to the determined focal distance setting.

In some embodiments, obtaining vision prescription data includes loading received vision prescription data.

In some embodiments, obtaining vision prescription data includes a focus training process to determine a vision prescription for the user.

In some embodiments, the focus training process includes requesting the user to choose between varying focal distance settings.

In some embodiments, detecting a focus distance includes detecting a direction of gaze of both eyes of the user to determine a relative angle between the gazes of each eye.

In some embodiments, detecting a focus distance includes detecting a width or thickness of a lens of one or both eyes of the user.

In some embodiments, further comprising instructions that, when executed by the processor, cause the processor to perform operations comprising: performing an eye characteristic training process to determine lens width or thickness measurements for the user.

In some embodiments, detecting a focus distance includes detecting a width or thickness of a lens of one or both eyes of the user, and further comprising instructions that, when executed by the processor, cause the processor to perform operations comprising: performing an eye characteristic training process to determine lens width or thickness measurements for the user.

In some embodiments, the medium further includes instructions that, when executed by the processor, cause the processor to perform operations comprising: enabling a telephoto function or macro function of the eyeglasses.

In some embodiments, enabling the telephoto function or macro function includes automatically enabling the telephoto function or macro function in response to detecting a distance at which the user is viewing.

What is claimed is:

1. An apparatus comprising:
   a one or two variable focus lenses, including a first variable focus lens for a first eve of a user of the apparatus;
   one or two lens actuators to change the focus of the one or two variable focus lenses, including a first lens actuator to change the focus of the first variable focus lens; and
   one or more focus distance components coupled to detect a focus distance of one or both eyes of a user of the apparatus, wherein a first focus distance of the one or more focus distance components includes an eve sensor to continuously determine widths of a lens of an eve of the user to detect the focus distance of one or both eyes of the user;
   wherein the one or more each of the one or two lens actuators is to set a focal distance of each of the one or more a respective variable focus lens, a focal distance setting for each of the one or two variable focus lenses to be determined in response to the focus distance of the one or both eyes of the user detected by the one or more focus distance components; and wherein the focal distance setting for each of the one or two variable focus lenses includes adjustment for a vision prescription of the user.

2. The apparatus of claim 1, further comprising a controller to control at least some processes of the apparatus.

3. The apparatus of claim 1, wherein the adjustment for a vision prescription of the user includes an adjustment for the user for a plurality of different distances.

4. The apparatus of claim 1, further comprising one or more of a transceiver to transmit and receive wireless communication data with an external apparatus or one or more ports to transmit and receive wired communication data with the external apparatus.

5. The apparatus of claim 4, wherein the data received by the transceiver includes vision prescription data for the user.

6. The apparatus of claim 1, wherein at least one of the one or more variable focus lenses is either:
an opto-mechanical variable focus lens, wherein the lens actuator for the opto-mechanical lens includes a motor to adjust focus of the opto-mechanical lens; or
an electro-optical variable focus lens, wherein the lens actuator of the electro-optical lens includes a component to control a current to adjust a focus of the electro-optical lens.

7. The apparatus of claim 1, wherein the apparatus further includes a training mode to determine eye characteristics of the user for operation of the eye sensor, wherein the eye characteristics include a width a lens of an eye of the user.

8. The apparatus of claim 1, wherein the apparatus further includes one or more of a macro function and a telephoto function, wherein the macro function or telephoto function includes a zoom function.

9. The apparatus of claim 8, wherein the apparatus further comprises an outward facing camera, wherein the apparatus provides a macro function or telephoto function utilizing an image captured by the outward facing camera.

10. The apparatus of claim 1, further comprising one or more of:
one or more projectors to provide an image for the user and one or more prisms to direct the image of each of the one or more projectors to one or more eyes of the user; or
one or more transparent computer displays to provide an image for the user.

11. The apparatus of claim 1, wherein the apparatus includes a training mode to determine the vision prescription of the user.

12. A non-transitory computer-readable storage medium having stored thereon data representing sequences of instructions that, when executed by a processor, cause the processor to perform operations comprising:
obtaining vision prescription data for a user of automatic focus prescription lens eyeglasses;
entering an automatic adjusting mode for the eyeglasses, the eyeglasses including one or two variable focus lenses;
continuously detecting a focus distance of one or both eyes of the user,
wherein detecting a focus distance includes continuously detecting with an eye sensor widths of a lens of one or both eyes of the user of the eyeglasses;
determining a lens focal distance setting based on at least the width of the lens of one or both eyes of the user of the eyeglasses, wherein the lens focal distance setting is offset by a correction based on the vision prescription data for the user; and if the determined focal distance setting is different than a current focal distance setting for the eyeglasses, automatically changing focus of the one or two variable focus lenses of the eyeglasses with one or two lens actuators to the determined focal distance setting.

13. The medium of claim 12, wherein obtaining vision prescription data includes loading received vision prescription data.

14. The medium of claim 12, obtaining vision prescription data includes a focus training process to determine a vision prescription for the user, wherein the focus training process includes requesting the user to choose between varying focal distance settings.

15. The medium of claim 12, and further comprising instructions that, when executed by a processor, cause the processor to perform operations comprising:
performing an eye characteristic training process to determine lens width measurements for the user.

16. The medium of claim 12, further comprising instructions that, when executed by the processor, cause the processor to perform operations comprising:
enabling a telephoto function or macro function of the eyeglasses.

17. The medium of claim 16, wherein enabling the telephoto function or macro function includes automatically enabling the telephoto function or macro function in response to detecting a distance at which the user is viewing.

18. A system comprising: automatic focus prescription lens eyeglasses including:
a one or two variable focus lenses, including a first variable focus lens for a first eve of a user of the apparatus;
one or two lens actuators to change the focus of the one or two variable focus lenses, including a first lens actuator to change the focus of the first variable focus lens one or more focus distance components coupled with the frame to detect a focus distance of one or both eyes of a user of the apparatus,
wherein a first focus distance of the one or more focus distance components includes an eve sensor to continuously determine widths of a lens of an eye of the user to detect the focus distance of one or both eyes of the user, and at least one of a wireless transceiver for wireless communication or a communication port for wired communications; and
an external apparatus to operate cooperatively with the eyeglasses, the external apparatus including: at least one of a wireless transceiver for wireless communication or a communication port for wired communications, a controller to control at least some operations relating to the eyeglasses, and a memory to store data;
wherein the one or more each of the one or two lens actuators is to set a focal distance of each of the one or more a respective variable focus lens, a focal distance setting for each of the one or two variable focus lenses to be determined in response to the focus distance of the one or both eyes of the user detected by the one or more focus distance components; and wherein the focal distance setting for each of the one or two variable focus lenses includes adjustment for a vision prescription of the user.

19. The system of claim 18, wherein the adjustment for a vision prescription of the user includes an adjustment for the user for a plurality of different distances.

20. The system of claim 18, wherein the one or two variable focus lenses include at least one of an opto-mechanical variable focus lens and an electro-optical variable focus lens.

21. The system of claim 18, wherein the system further includes a training mode to determine eye characteristics of the user for operation of the eye sensor, wherein the eye characteristics include a width of a lens of an eye of the user.

22. The system of claim 18, further comprising at least one of:
- one or more projectors to provide an image for the user one or more prisms to direct the image of each of the one or more projectors to one or both eyes of the user; or
- one or more transparent computer displays to provide an image for the user.

23. The apparatus of claim 1, wherein determining a width of the lens includes determining a diameter of the lens.

* * * * *

UNITED STATES PATENT AND TRADEMARK OFFICE
CERTIFICATE OF CORRECTION

PATENT NO.      : 9,465,237 B2
APPLICATION NO. : 14/142591
DATED           : October 11, 2016
INVENTOR(S)     : Tate et al.

Page 1 of 1

It is certified that error appears in the above-identified patent and that said Letters Patent is hereby corrected as shown below:

Claims

In column 18, at line 50, claim 1, delete "eve" and insert --eye--.

In column 18, at line 59, claim 1, delete "eve" and insert --eye--.

In column 18, at line 63, claim 1, delete "the one or more".

In column 18, at lines 64-65, claim 1, delete "each of the one or more".

In column 20, at line 24, claim 6, delete "eve" and insert --eye--.

In column 20, at line 43, claim 10, delete "eve" and insert --eye--.

In column 20, at line 55, claim 12, delete "the one or more".

In column 20, at lines 56-57, claim 12, delete "each of the one or more".

Signed and Sealed this
Twenty-second Day of November, 2016

Michelle K. Lee
*Director of the United States Patent and Trademark Office*